March 29, 1960 — R. T. BURNETT — 2,930,454
AUTOMATIC POSITIONING DEVICE
Filed July 11, 1955 — 2 Sheets-Sheet 1

INVENTOR.
RICHARD T. BURNETT.
BY John A. Young
ATTORNEY.

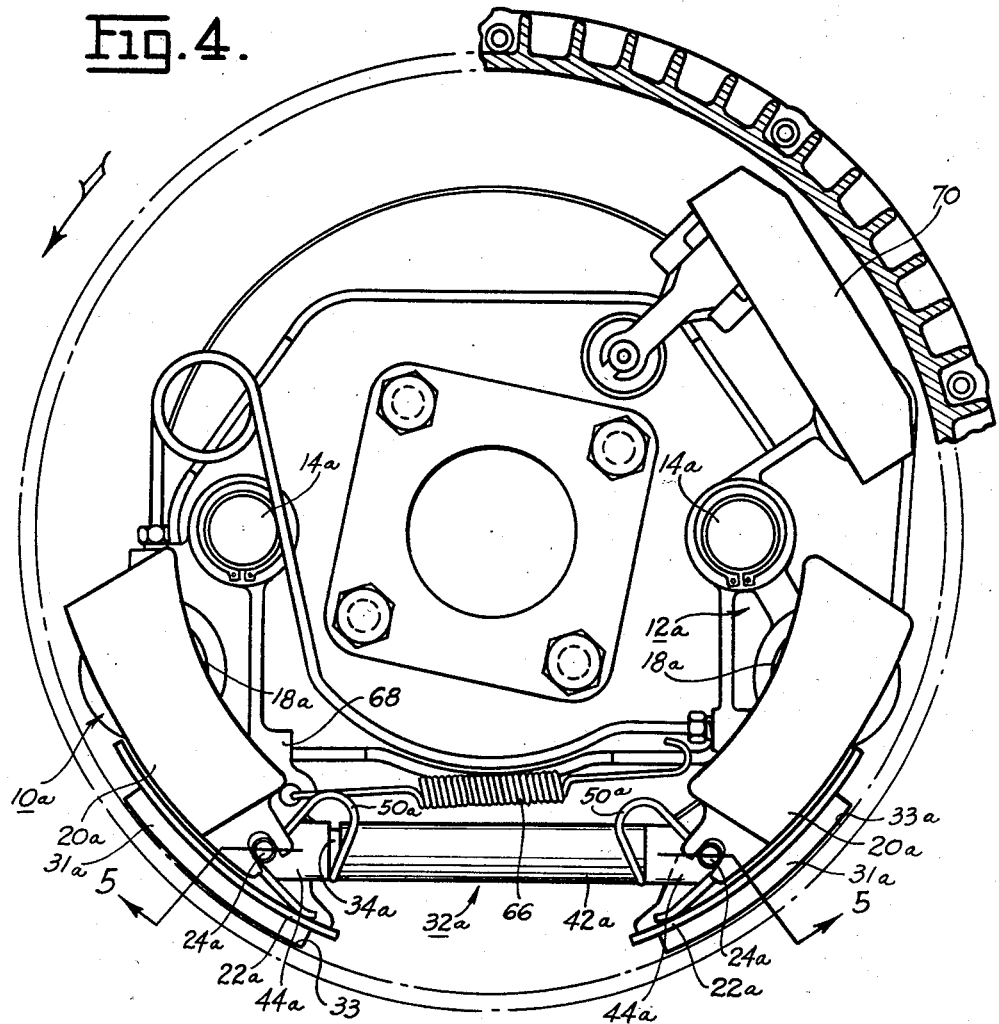
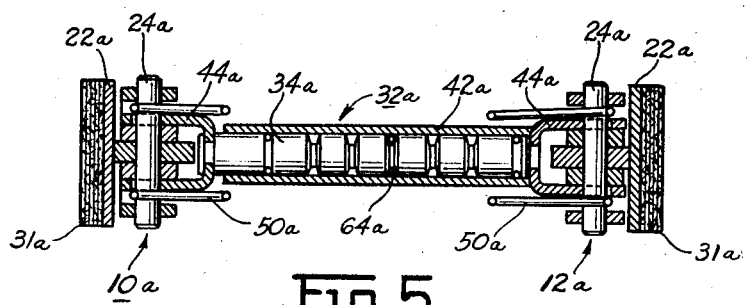

United States Patent Office 2,930,454
Patented Mar. 29, 1960

2,930,454

AUTOMATIC POSITIONING DEVICE

Richard T. Burnett, South Bend, Ind., assignor to Bendix Aviation Corporation, South Bend, Ind., a corporation of Delaware Application July 11, 1955, Serial No. 521,214

8 Claims. (Cl. 188—79.5)

This invention relates generally to automatic friction element positioning device; specifically, the invention is an automatic adjustor for a friction element which both positions the friction element responsively to wear and controls the rate of application of the friction element.

The primary object of the invention is to reduce brake noise. This object of the invention involves both retarding the rate of application of a friction element of the brake, and automatically positioning this friction element as a function of wear which is incident to brake usage.

One of the novel features of the invention is the adaptation of the adjustor as a force transmitting member which forms a part of the parking brake in the rear wheel set of brakes.

These objects and features of the invention as well as others, will appear more fully hereinafter from a consideration of the following description, taken in connection with the accompanying drawings, wherein a plurality of embodiments of the invention are illustrated by way of example.

In the drawings:

Figure 4 shows in side elevation, a rear wheel brake assembly with a further embodiment of the invention incorporated therein; and Figure 5 is a section view taken on line 5—5 of Figure 4.

It has been my experience that brake noise arises from two different conditions, one is excessively high rate of movement of the shoes into engagement with the cylindrical part of the rotor or anchor device as the case may be, and the other is excessive clearance between the shoe and the engageable surface of the rotor when the brake is released. The invention proposed to remedy brake noise in a twofold manner—namely, reducing rate of movement of the shoes and automatically adjusting the shoes to avoid excessive brake clearances. These two functions of the device will become clearer as the description progresses.

Figure 1:
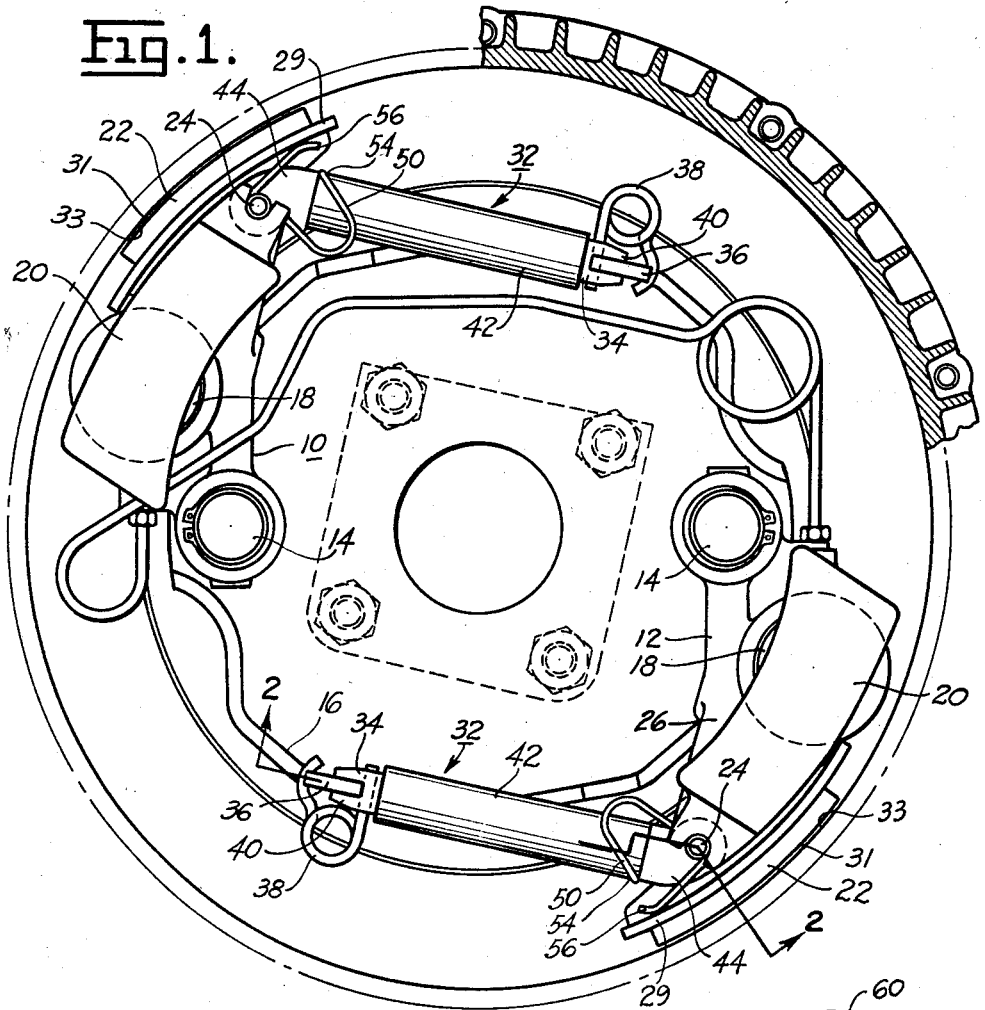
Figure 1 is a side elevation of a front wheel brake assembly with the invention incorporated therein. A part of the rotor is removed to show the invention more clearly.

In Figure 1, two composite brake units designated generally by reference numerals 10 and 12 are pivotally mounted on anchors 14 at opposite sides of a torque plate 16. Each of the brake units is identically constructed and consists of a fluid motor 18 which is arranged to apply oppositely-acting "disk" or "flat" shoe elements 20. Arcuate shoe element 22 is radially applied by pivoting the unit. The brake unit is caused to pivot by engagement of the "flat" shoes elements 20 with two spaced sides of a rotor (not shown). For complete details of this operation reference may be made to copending applications Serial No. 466,861, filed November 4, 1954; application Serial No. 456,218, filed September 15, 1954, now U.S. Patent No. 2,871,991; and application Serial No. 434,846, filed January 7, 1954, now abandoned.

Figure 2:
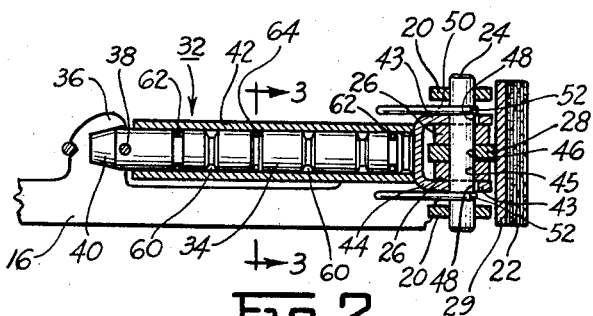
Figure 2 is a section view taken on line 2—2 of Figure 1.

Referring to Figure 2, the "flat" shoe elements 20 are piloted in their axial movement by a post 24 which is transversely received through a bifurcated component 26 of the brake unit and web 28 of the arcuate shoe element 22. Fastened between the torque plate 16 and each of the brake units is a device 32 for both retarding the rate of application of the arcuate shoe element 22 and also automatically positioning the arcuate shoe element 22 according to the extent of wear of lining 31 on the arcuate shoe element 22.

The device 32 consists of a plunger 34 which is fastened to a projection 36 on the torque plate 16. A torsion spring 38 is used to keep the slotted end 40 of the plunger 34 in contact with the projection 36. A sleeve 42 is fitted over the plunger 34. Clevis 44 is joined to the sleeve 42 by a welding operation or the like; the legs 43 of the clevis 44 overlie the bifurcated component 26 and web 28 of the brake unit (Figure 2).

The post 24 is positioned in congruent openings 45 and 46 which are formed in bifurcated component 26 and web 28 of the brake unit. The post 24 also extends through openings 48 in the overlying legs 43 of the clevis 44. The openings 48 are elongated to permit slight relative movement of the pin which thus provides lost motion between the shoe 22 and the clevis 44.

To return the shoe 22 through this lost motion, I provide a wire spring 50 which is looped between a groove 52 on the post 24 and edge 54 on the clevis 44. The wire spring 50 is next bent down and back upon itself, and then looped again to engage groove 52 in the other end of the post 24. The wire spring exerts a force between the pin 24 and sleeve 42 so that the shoe portion of the unit is retracted through the lost motion provided in opening 48. The ends of the wire spring 50 form extensions 56 which bear against rim 29 of the shoe 22 thus causing a tendency of the shoe 22 to turn about post 24 so that web 28 is caused to bottom at the base of the furcations 26. It is not essential to the invention that extensions 56 to be included with the wire spring 50.

A plurality of spaced grooves 60 are formed in plunger 34. O-ring seals 62 are positioned in the grooves 60 which are adjacent the ends of the plunger. A viscous material (silicone or the like) is coated on the plungers to form a film between the engaging surface of the plunger 34 and sleeve 42. The viscous film resists relative movement between the plunger and sleeve with a force which is proportional to the rate of relative movement. The two O-ring seals 62 prevent leakage of the viscous material through the ends of the device 32.

Figure 3:
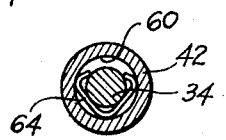
Figure 3 is a section view taken on line 3—3 of Figure 2.

A triangular friction spring 64 (Figure 3) is received in one of the grooves 60 and bears against the inner surface of the sleeve 42 to resist relative movement between the plunger 34 and sleeve 42. It will be noted that plunger 34 bottoms on clevis 44 to limit the amount of sliding of sleeve 42 on the plunger 34 toward projection 36.

The viscous medium resists relative movement between the sleeve 42 and plunger 34, and this resistance reduces the velocity of the plunger 34 when it engages clevis 44, so that the impingement is cushioned; brake noise is thus deadened. The resistance to shoe movement offered by the viscous medium further retards the rate of movement of the shoe against the cylindrical port of the rotor when the unit is turned counterclockwise on its associated anchor. Since the impact between the shoe and cylindrical surface of the rotor is cushioned, brake noise is kept at a low volume.

The device 32 is also utilizable in the rear wheel brakes, as shown in Figure 4 where it serves the same function as in the front wheel brakes and additionally, forms a part of the parking brake mechanism.

The device 32a is fastened between the shoe portions 22a of brake units 10a and 12a. As shown in Figure 5, the plunger 34a is secured to the shoe portion 22a of unit 10a through a clevis 44a and a pin 24a. The sleeve 42a is fastened to the shoe portion 22a of brake unit 12a through a clevis 44a and pin 24a. A spring 66 urges counterclockwise movement of unit 10a about the anchor 14a, thus bringing the shoe portion 22a of unit 10a into abutment with an anchor 68.

Lost motion is provided between the pins 24a and each of the clevises 44a. The lost motion between the clevis and each of the units defines the extent of retraction of the shoe portion 22a of unit 12a. This clearance is normally taken up by the two wire springs 50a. The wire spring which is associated with unit 10a pulls the plunger 34a to the left and the plunger movement carries the sleeve therewith since they are held together by a spring 64a which is located in the same manner as described for the previous embodiment. The unit 12a is turned slightly by the wire spring 50a so that clearance between the post 24a and clevis 44a is taken up. It will thus be seen that the retraction of the shoe portion 22a of unit 12a is equal to the combined clearances between both of the pins 24a and associated clevis 44a.

During parking brake operation with the rotor turning clockwise, the unit 12a is caused to pivot about anchor 14a by an auxiliary, mechanically applied brake 70. The device 32a acts as a strut to turn unit 10a clockwise about anchor 14a bringing the shoe portion 22a thereof into forcible engagement with a cylindrical surface of the rotor. When the rotor turns counterclockwise, unit 12a is turned counterclockwise to apply the shoe portion thereof.

Springs 64 and 50 in Figure 2 and their counterparts in Figures 4 and 5, are not essential to the devices for retarding the rate of application of the shoe portion; the viscous coating between the sleeve and plunger accomplishes this. The devices 32 and 32a act as automatic adjustors, determining the retracted position of the shoe portion associated therewith; it is not necessary that a viscous medium be included to accomplish this. I have found, however, that brake noise resulting from too sudden application of the shoe elements against the cylindrical surface of the rotor, is best prevented by both adjusting the shoe portion and also retarding the rate of application of the shoe portion. It is to be understood however that these are distinct functions which are combined in the device 32.

The problem of excessive rate in applying a shoe element, is not as acute in conventional "shoe" brakes because application of the shoes is accomplished by a hydraulic motor which is under the control of the operator. Also, there are certain inherent delaying factors in such systems which reduce the rate of application of the shoe below the level causing objectionable brake noise. In this invention, however, application of the shoes is brought about by torque which is developed from application of the flat shoe elements. Engagement of the flat shoe elements develops a high order of torque on the brake unit causing abrupt pivoting of the unit to apply the arcuate shoe friction element at an exceedingly high rate. There is a sharp impact between the shoe element and the cylindrical surface of the rotor. It will, therefore, be seen that operating conditions with the present brake are somewhat different from those encountered with conventional brake shoes. It becomes important under these conditions to control the rate of application of the shoe element and limit this rate of application to a range below that producing audible brake noises.

A further factor which leads to brake noise involves the clearance between the shoe friction element and the engaging surface of the rotor. It has been my experience, that when brake "shoe" clearance is in excess of from about ten to thirteen thousandths of an inch, then brake noise is likely to occur. In order to provide for this, the device serves to control the extent of retraction of the shoe and limit this retraction to clearances which are less than about ten to thirteen thousandths of an inch.

Elimination of brake clicking as before mentioned, involves both positioning the shoe friction element with respect to the rotor, and also controlling the rate of application of the shoe friction element as it moves from retracted to applied position. Although these functions are distinct they are both embodied in the device 32, the operation of which will next be described.

Assuming counterclockwise movement of the rotor, application of the "flat" shoe elements 20 will tend to pivot each of the brake units in a counterclockwise direction about their respective anchors 14. Movement of the units brings the respective shoe friction element 22 toward the engageable surface of the rotor. The direction of movement of the shoe friction element and the location of the elongated opening 48 is such that the post 24 moves with a rolling action along the edges of the opening 48 rather than moving directly thereacross. This rolling movement is desirable because it produces oblique rather than square impingement between the post 24 and opening 48 so that there is a reduced likelihood of brake "click." When clearance is taken up between the opening 48 and pin 24, force is then exerted on the clevis 44, pulling the sleeve 42 (Figure 2) toward the right. Since the plunger 34 is fixed by the coil spring 38 to the support member, relative movement is produced between the sleeve 42 and plunger 34. The viscous coating between the engaging surfaces of the sleeve and plunger resists this relative movement therebetween, with a force proportional to the rate of movement. The viscous coating thus exerts a retarding force on the rate of application of the shoe portion of unit 12 to minimize the possibility of brake click. The same operation is simultaneously effected by device 32 which is associated with unit 10.

With repeated brake applications while the vehicle is traveling forwardly (counterclockwise rotor movement in Figure 1), the lining 31 is adjusted with respect to the rotor. The clearance between the lining 31 and the engageable rotor surface 33 is maintained substantially constant owing to the adjusting function of device 32. If a brake application is made while the vehicle is travelling in reverse, sleeve 42 slides on the plunger 34 toward the left (Figure 2) until the clevis 44 bottoms on the plunger 34. To prevent sudden slamming of the plunger 34 on the clevis 44, the rate of relative movement between the plunger and sleeve is retarded by the viscous coating so that the impact is cushioned and "click" is again prevented.

Assume next that the vehicle reverses direction and the brake is once again applied. The rate of movement of the lining 31 on the arcuate shoe toward the engageable surface of the rotor is retarded by the resistance of the viscous coating between the relatively movable plunger 34 and sleeve 42. Thus click from sudden slamming of the lining 31 against the rotor is once again prevented.

It will be understood from the foregoing explanation that the device 32 automatically adjusts the shoe during successive forward applications of the shoe and also retards the rate of movement of the shoe so that click is prevented or reduced during each forward or reverse application.

When the brake is released, the wire spring 50 returns the shoe portion through the lost motion provided between post 24 and elongated opening 48. It will be noted that sleeve 42 moves with respect to the plunger during the brake application to compensate for any lining wear that occurs during the course of the stop. The clearance between the lining and the engageable surface of the rotor remains substantially the same and is not in excess of that provided by the lost motion. One of the characteristics of the viscous medium is that it resists relative movement of the sleeve and plunger only when the force producing this relative movement acts for a short period of time. When persistent forces are exerted over a great period of time, relative movement may occur between the sleeve and plunger which changes the extent of retraction of the shoe portion of unit 12. To prevent this from occurring, there is included a triangular friction spring 64 which additionally resists relative movement between the sleeve and plunger. It is apparent that the relative position of the plunger and sleeve determines the retracted position of the shoe element, and once this adjustment occurs, the spring 64 stabilizes the relative position of the plunger and sleeve.

The device illustrated in Figures 4 and 5 for the rear wheel brake operates in the same manner as described, with the exception that it further serves as a component in the braking system. The devices 32a serves as a strut during parking brake operation. For further details of the manner in which the device is used in a parking brake system reference should be made to my copending application Ser. No. 466,861, filed November 4, 1954.

Although this invention has been described in connection with only a limited number of embodiments, it will be apparent to those skilled in the art that the principles of the invention are susceptible of numerous other applications. I intend therefore, to include within the scope of the following claims all equivalent means for accomplishing the same or equivalent results of the invention.

I claim:

1. In a brake a force-transmitting member in combination with a movable friction element comprising two relatively slidable elements, a viscous medium providing a coating between the opposed surfaces of said slidable elements yieldably retarding relative sliding movement between said elements with a resistance force proportional to the force inducing said sliding movement, said force-transmitting member being arranged to communicate force through one of said elements, and an interconnection of said force-transmitting member with said one friction element, said interconnection having lost motion therein to permit retraction of the friction element from its applied position.

2. In a brake having a friction unit, a radially actuated friction element of said unit, and a force-transmitting member in combination with said element and comprising two relatively slidable elements, a viscous medium forming a coating between the opposed slidable surfaces of said slidable elements yieldably retarding relative movement of said slidable elements, said member also being arranged to communicate force through one of said elements during braking and a connection between one of said slidable elements and the radially actuated friction element of said friction unit, said interconnection being provided with lost motion therein to permit retraction of the friction unit.

3. An automatic adjusting device for brakes including a fixed support member and a radially-applied friction element, said adjusting device comprising a plunger, means securing said plunger to said fixed member, a sleeve slidably fitted over said plunger, means for fastening said sleeve to a radially-applied friction element, said means having lost motion therein permitting retraction of the radially-applied friction element, a resilient means carried by said sleeve and operatively secured to said friction element for holding the friction element in a normally retracted position, and means forming a viscous coating which provides the bearing surfaces between said sleeve and plunger and thereby adapted for exerting shear resistance force between said sleeve and plunger to resist relative sliding therebetween which adjustably positions the radially-applied friction element.

4. In a brake having a radially actuated friction-producing element and a relatively fixed member for supporting said element, an automatic adjustor for said friction-producing element comprising a first member connected to the friction-producing element with lost motion therebetween providing radial retraction of said element, a second member yieldably secured to a fixed part of the brake, said members being slidably interfitted and adapted for relative movement therebetween, a spring element received in a grooved portion of one of said elements, said spring element being deformably fitted between said members to yieldably resist relative movement between said members, a viscous material coating forming a bearing surface between said members to yieldably resist relative movement therebetween with a force which increases responsively to the rate of relative movement and means for holding the friction-producing element in a normally retracted position, said first and second members being movable relatively to each other by movement of said friction-producing element in excess of said lost motion and held in such position by said spring to provide adjustment for said element.

5. In a brake having a relatively fixed portion, a friction-producing element and a device for automatically adjusting and controlling the rate of application of said friction-producing element, said device being inclusive of slidably interfitted members operatively connected to said friction-producing element and said fixed portion of the brake respectively, said members being relatively movable responsively to movement of said friction-producing element in excess of a predetermined amount, means forming a viscous coating between said slidably interfitted members for yieldably retarding relative movement of said members with a variable force which is proportionate to the force producing said relative movement whereby actuation and retraction of said friction-producing element is effectively dampened, means frictionally resisting relative movement of said slidably interfitted members, and means for maintaining the friction-producing element in a normally retracted position defined by the relative position of said relatively movable members.

6. In a brake having a radially actuated friction-producing element, an adjusting device for controlling the rate of movement of said friction-producing element comprising two relatively movable members, said device being extensible and a viscous coating medium providing a bearing surface between said relatively movable members for resisting relative movement of said members with a force proportional to the rate of movement of said element to thereby control the rate of actuation and retraction of said element, said adjusting device having frictionally held successive extensible positions defining the retracted position of said friction-producing element.

7. The adjusting device structure in accordance with claim 6 including a lost motion connection between one of said relatively movable members and said friction-producing element, return spring means connected between the friction-producing element and the relatively movable member connected therewith to maintain the friction-producing element normally retracted by an amount determined from said lost motion connection.

8. The structure in accordance with claim 7 including resilient means confined between said relatively movable members to resist sliding movement therebetween.

References Cited in the file of this patent

UNITED STATES PATENTS

| | | |
|---|---|---|
| 2,251,379 | Van der Hof | Aug. 5, 1941 |
| 2,287,238 | Goepfrich | June 23, 1942 |
| 2,619,198 | Freund | Nov. 25, 1952 |
| 2,789,666 | Burnett | Apr. 23, 1957 |